United States Patent
Yi et al.

(10) Patent No.: US 9,410,521 B2
(45) Date of Patent: Aug. 9, 2016

(54) FUEL INJECTOR SPRAY PATTERN

(71) Applicant: Ford Global Technologies, LLC, Dearborn, MI (US)

(72) Inventors: Jianwen James Yi, West Bloomfield, MI (US); Claudia Olivia Iyer, Canton, MI (US); Steven Wooldridge, Saline, MI (US); Gary Alan Coulson, Ypsilanti, MI (US); David Bruce Reiche, Livonia, MI (US); Brad Alan VanDerWege, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 13/946,740

(22) Filed: Jul. 19, 2013

(65) Prior Publication Data

US 2015/0020768 A1     Jan. 22, 2015

(51) Int. Cl.
| | |
|---|---|
| *F02B 5/00* | (2006.01) |
| *F02B 3/00* | (2006.01) |
| *F02B 17/00* | (2006.01) |
| *F02M 61/18* | (2006.01) |
| *F02B 23/10* | (2006.01) |
| *F02B 75/12* | (2006.01) |

(52) U.S. Cl.
CPC .......... *F02M 61/1806* (2013.01); *F02B 23/104* (2013.01); *F02B 23/105* (2013.01); *F02B 2023/103* (2013.01); *F02B 2075/125* (2013.01); *Y02T 10/123* (2013.01); *Y02T 10/125* (2013.01)

(58) Field of Classification Search
USPC ................... 123/302, 305, 295, 299
See application file for complete search history.

(56) References Cited

U.S. PATENT DOCUMENTS

| | | | |
|---|---|---|---|
| 6,659,075 B1 * | 12/2003 | Tokuyasu ............ | F02B 17/005 123/301 |
| 7,104,250 B1 | 9/2006 | Yi et al. | |
| 7,418,940 B1 * | 9/2008 | Yi ........................ | F02B 17/005 123/295 |
| 8,347,853 B2 | 1/2013 | Xu et al. | |
| 2004/0020459 A1 * | 2/2004 | Arndt et al. .................. | 123/305 |
| 2011/0162621 A1 * | 7/2011 | Xu ........................ | F02B 23/104 123/305 |
| 2011/0277727 A1 | 11/2011 | Hay et al. | |

* cited by examiner

*Primary Examiner* — Lindsay Low
*Assistant Examiner* — Syed O Hasan
(74) *Attorney, Agent, or Firm* — Julia Voutyras; Alleman Hall McCoy Russell & Tuttle LLP

(57) ABSTRACT

A fuel injector having an injector axis, comprising a first nozzle aiming in a first radial direction; a first nozzle pair aiming in radial directions each equally angled relative to the first direction, closest to the first radial direction, and having a longest radial offset; a nozzle second pair in radial directions each equally angled relative to the first direction; and another nozzle aiming opposite the first radial direction and having a shortest radial offset.

19 Claims, 3 Drawing Sheets

FUEL INJECTOR SPRAY PATTERN

FIELD

The present application relates to a fuel injector having multiple nozzles angled in preselected directions to provide a range of spray patterns for improved fuel efficiency and combustion characteristics.

BACKGROUND AND SUMMARY

Direct-Injection Spark-Ignition (DISI) internal combustion engines, which may include Gasoline Turbocharged Direct Injection (GTDI) combustion engines, may provide more precise control over the amount, and timing of the fuel provided for combustion according to engine load. DISI engines generally provide increased fuel efficiency and improved emissions control as compared with engines without DISI.

Efforts have been made to provide even greater levels of fuel efficiency and improved emissions control using DISI and/or GTDI. For example, U.S. Pat. No. 7,418,940 discloses a fuel injector spray pattern for direct injection spark ignition engines having a first plurality of jets oriented to spray fuel generally downward toward the piston bowl and a second plurality of jets oriented to spray fuel generally across the cylinder toward the exhaust valves. However, the inventors herein have recognized at least one shortcoming with the disclosed approach.

For example, the inventors herein have discovered that the injector nozzles can be directed to provide spray patterns, within a particular range of configurations that tends to reduce valve wetting and to minimize liner and piston wetting. In addition, some of the example spray configurations disclosed herein tend to interact with the direct-injection piston bowl to produce a more stable stratified mixture around the spark plug during cold start operation for cold start combustion stability and reduced emissions.

Embodiments in accordance with the present disclosure may provide a fuel injector having an injector axis, comprising a first nozzle aiming in a first radial direction; a first nozzle pair aiming in radial directions each equally angled relative to the first direction, closest to the first radial direction, and having a longest radial offset; a nozzle second pair in radial directions each equally angled relative to the first direction; and another nozzle aiming opposite the first radial direction and having a shortest radial offset. In this way, fuel impingement on surfaces, such as the piston, intake valves, and the liner, and the like may be reduced while reducing soot formation and maintaining effective and efficient combustion.

Further embodiments in accordance with the present disclosure may provide a fuel injector system for an internal combustion engine and a fuel injector for a combustion chamber. The fuel injector system may include a fuel injector having an injector axis. Six injector nozzles may be disposed around the injector axis. Each of the six injector nozzles may be configured to direct six respective streams of fuel such that each respective stream of fuel may travel respective predetermined six radial distances from the injector axis as measured on a plane normal to the injector axis. A fourth radial distance may be a shortest distance relative to the other five radial distances. A second and a sixth radial distance may be approximately equal to each other and longer than the other four radial distances. A third and a fifth radial distance may be approximately equal to each other and may be intermediate radial distances being shorter than the second and sixth radial distance and longer than the fourth radial distance. In addition, a first radial distance may be shorter than the second and sixth radial distance and longer than the fourth radial distance. In this way, fuel impingement on surfaces, such as the piston, intake valves, and the liner, and the like may be reduced. In this way, combustion emissions may be reduced, and/or fuel economy may be improved. Also in this way, a source of soot emissions may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
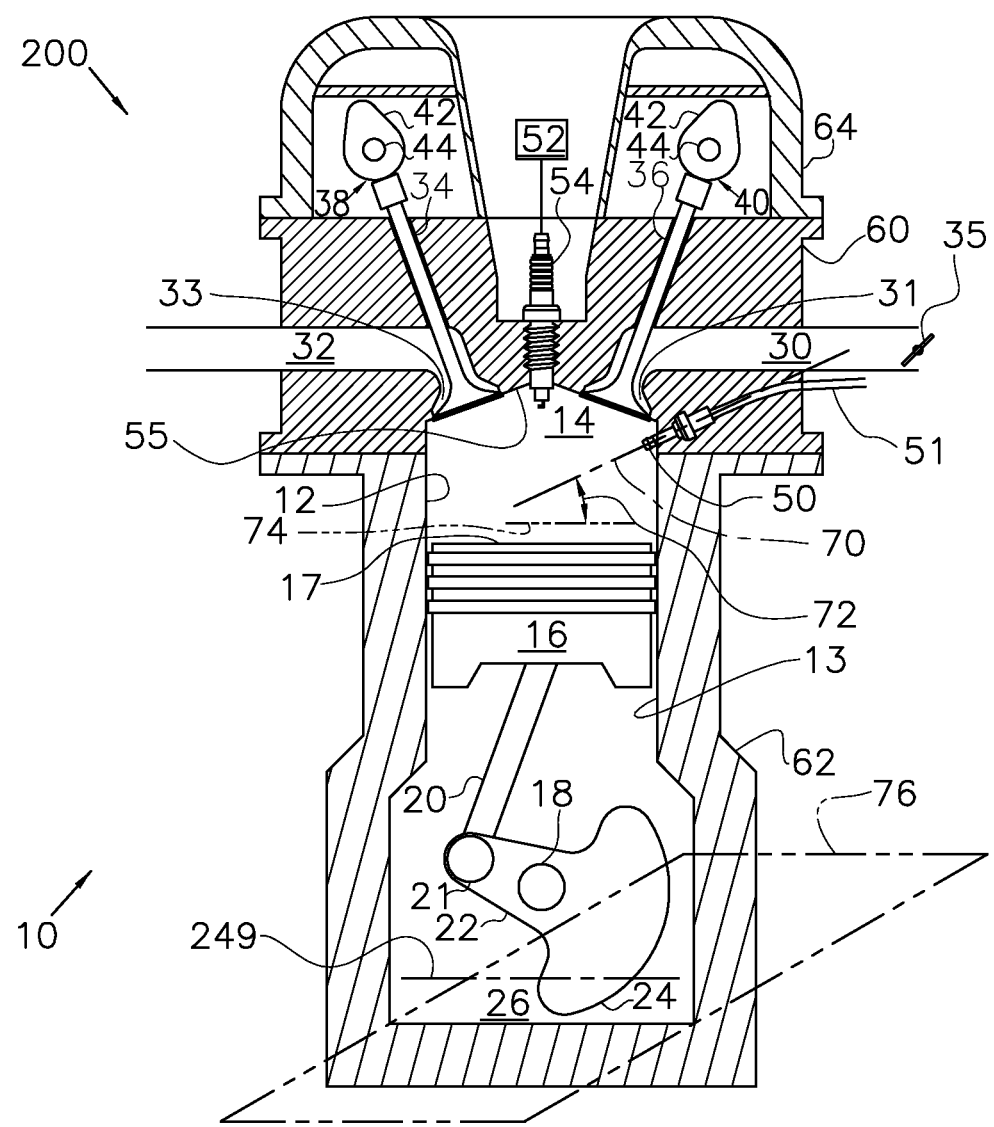
FIG. 1 is a schematic diagram of an example engine in accordance with the present disclosure.

As described herein, various fuel injector nozzle configurations are described. For example, a pattern of six nozzles may be arranged in a particular way to solve issues with combustion stability, cold start emissions, soot generation, etc. In one example, the nozzles may be arranged so that five nozzles aim to one side of the injector axis, and a single nozzle aims to the other side. The single nozzle may have the shortest radial offset from the axis, while the other five nozzles are arranged with one nozzle opposite the single nozzle, and two additional pairs of nozzles flanking the one opposite nozzle.

Additional embodiments in accordance with present disclosure may provide particular radial distances by one, or both, of directing each of the six nozzles in particular angular directions as measured in a normal plane and a side plane. For example, the first radial distance may be effected by the first nozzle being oriented at a first normal plane angle of between −5 degrees and +5 degrees as measured from a centerline located to correspond with, and/or parallel with, a combustion chamber centerline with a positive direction toward one or more intake ports and a first side angle of between 10 degrees and 20 degrees as measured in a side plane that may be perpendicular to the normal plane and substantially parallel with, or coplanar with, the centerline. The second radial distance may be effected by the second nozzle being oriented a second normal plane angle of between 33.5 degrees and 53.7 degrees as measured in a way similar to the measurement of the first normal plane angle, and a second side angle of between 26.2 degrees and 36.2 degrees as measured in a way similar to the measurement of the first side angle. The third radial distance may be effected by the third nozzle being oriented a third normal plane angle of between 66.8 degrees and 76.8 degrees as measured in a way similar to the measurement of the first normal plane angle, and a third side angle of between 10.1 degrees and 20.1 degrees as measured in a way similar to the measurement of the first side angle. The fourth radial distance may be effected by the fourth nozzle being oriented a fourth normal plane angle of between 175 degrees and 185 degrees as measured in a way similar to the measurement of the first normal plane angle, and a fourth side angle of between 0 degrees and 10 degrees as measured in a way similar to the measurement of the first side angle. The fifth radial distance may be effected by the fifth nozzle being oriented a fifth normal plane angle of between 10.1 degrees and 20.1 degrees as measured in a way similar to the measurement of the first normal plane angle, and a fifth side angle of between 10.1 degrees and 20.1 as measured in a way similar to the measurement of the first side angle. The sixth radial distance may be effected by the sixth nozzle being oriented a sixth normal plane angle of between −33.5 degrees and −53.7 degrees as measured in a way similar to the measurement of the first normal plane angle, and a sixth side angle of between 26.2 degrees and 36.2 degrees as measured in a way similar to the measurement of the first side angle. In this way, the third and fifth nozzles may minimize intake valve wetting, and may provide good air-fuel mixing during homogeneous-charge operation, which may lead to reduced soot emissions and increased fuel economy.

Also in this way, the first, second, and sixth nozzles may tend to contain fuel clouds in the piston bowl which may tend to provide advantageous combustion stability for light stratified-charge at cold-start operation. Also in this way the first second and sixth nozzles may also tend to reduce piston wetting which may lead to reduced smoke emissions.

Also in this way, the fourth nozzle may tend to reach the liner first which may better fit in a smaller cylinder bore engine and may provide reduced liner wetting. In this way, oil dilution may be reduced and particulate emissions may be reduced.

FIG. 1 is a cross-sectional diagram with schematic portions, illustrating a cross-section of an engine 10 in accordance with the present disclosure. Various features of the engine 10 may be omitted, or illustrated in a simplified fashion, for ease of understanding of the current description. For example, areas may be illustrated with continuous cross hatching that may otherwise indicate a solid body, however actual embodiments may include various engine components, and/or hollow, or empty, portions of the engine.

The cross-sectional view shown in FIG. 1 may be considered taken through one cylinder 12 of the engine 10. The cylinder 12 may be defined by or at least partially enclosed by a cylinder wall 13. Various components of the engine 10 may be controlled at least partially by a control system that may include a controller (not shown), and/or by input from a vehicle operator via an input device such as an accelerator pedal (not shown). The cylinder 12 may include a combustion chamber 14. A piston 16 may be positioned within the cylinder 12 for reciprocating movement therein. The piston 16 may include a piston face formed in one or more ways. For example the piston 16 may include a piston bowl 17. The piston 16 may be coupled to a crankshaft 18 via a connecting rod 20, a crank pin 21, and a crank throw 22 shown here combined with a counterweight 24. Some examples may include a discrete crank throw 22 and counterweight 24. The reciprocating motion of the piston 16 may be translated into rotational motion of the crankshaft 18. The crankshaft 18, connecting rod 20, crank pin 21, crank throw 22, and counterweight 24, and possibly other elements not illustrated may be housed in a crankcase 26. The crankcase 26 may hold oil. Crankshaft 18 may be coupled to at least one drive wheel (not shown) of a vehicle via an intermediate transmission system.

Further, a starter motor may be coupled to crankshaft 18 via a flywheel to enable a starting operation of engine 10.

Combustion chamber 14 may receive intake air from an intake passage 30, and may exhaust combustion gases via exhaust passage 32. Intake passage 30 and exhaust passage 32 may selectively communicate with combustion chamber 14 via respective intake valve 36 and exhaust valve 34. Intake valve 36 and exhaust valve 34 may be configured to operatively open and close respective intake port 31 and exhaust port 33. A throttle 35 may be included to control an amount of air that may pass through the intake passage 30. In some embodiments, combustion chamber 14 may include two or more intake valves and/or two or more exhaust valves.

In this example, intake valve 36 and exhaust valve 34 may be controlled by cam actuation via respective cam actuation systems 38 and 40. Cam actuation systems 38 and 40 may each include one or more cams 42 and may utilize one or more of cam profile switching (CPS), variable cam timing (VCT), variable valve timing (VVT) and/or variable valve lift (VVL) systems that may be operated by the controller to vary valve operation. The cams 42 may be configured to rotate on respective revolving camshafts 44. As depicted, the camshafts 44 may be in a double overhead camshaft (DOHC) configuration, although alternate configurations may also be possible. The position of intake valve 36 and exhaust valve 34 may be determined by position sensors (not shown). In alternative embodiments, intake valve 36 and/or exhaust valve 34 may be controlled by electric valve actuation. For example, cylinder 16 may include an intake valve controlled via electric valve actuation and an exhaust valve controlled via cam actuation including CPS and/or VCT systems.

In one embodiment, twin independent VCT may be used on each bank of a V-engine. For example, in one bank of the V, the cylinder may have an independently adjustable intake cam and exhaust cam, where the cam timing of each of the intake and exhaust cams may be independently adjusted relative to crankshaft timing.

Fuel injector 50 is shown coupled directly to combustion chamber 14 for injecting fuel directly therein in proportion to a pulse width of a signal that may be received from the controller. In this manner, fuel injector 50 may provide what is known as direct injection of fuel into combustion chamber 14. The fuel injector 50 may be mounted in the side of the combustion chamber 14 or in the top of the combustion chamber 14. Fuel may be delivered via fuel line 51 to fuel injector 50 by a fuel system that may include a fuel tank, a fuel pump, and a fuel rail (not shown). The fuel line 51 may be a hose, or passage which may be coupled to a mating engine component, such as cylinder head 60. The fuel injector 50 may have an injector axis 70 that may be oriented at an installation angle 72 relative to a reference line 74. The reference line 74 may correspond with, or be parallel with a reference, or reference-able plane 76 in or on the engine 10 as indicated with phantom lines shown at the bottom of the crankcase 26. Reference-able plane 76 may, for example, correspond with, or be parallel with an engine deck, or engine deck face.

Ignition system 52 may provide an ignition spark to combustion chamber 14 via spark plug 54 in response to a spark advance signal from the controller, under select operating modes. In this example the spark plug 54 is shown located at a top 55 of the combustion chamber 14.

Cylinder head 60 may be coupled to a cylinder block 62. The cylinder head 60 may be configured to operatively house, and/or support, the intake valve(s) 36, the exhaust valve(s) 34, the associated valve actuation systems 38 and 40, and the like. Cylinder head 60 may also support the camshafts 44. A cam cover 64 may be coupled with and/or mounted on the cylinder head 60 and may house the associated valve actuation systems 38 and 40, and the like. Other components, such as spark plug 54 may also be housed and/or supported by the cylinder head 60. A cylinder block 62, or engine block, may be configured to house the piston 16. In one example, cylinder head 60 may correspond to a cylinder 12 located at a first end of the engine. While FIG. 1 shows only one cylinder 12 of a multi-cylinder engine 10, each cylinder 12 may similarly include its own set of intake/exhaust valves, fuel injector, spark plug, etc.

The engine 10 may include a turbocharger (not shown) having a turbo compressor disposed on an induction air path for compressing an induction fluid before the induction fluid is passed to the intake passage 30 of the engine 10. In some applications, an inter-cooler (not shown) may be included to cool the intake charge before it enters the engine. The turbo compressor may be driven by an exhaust turbine which may be driven by exhaust gasses leaving the exhaust manifold 32. In some cases, the throttle 35 may be upstream from the turbo compressor 94 instead of downstream as illustrated. The turbo compressor may be coupled for rotation with the exhaust turbine via a turbine shaft. Although not illustrated, the engine 10 may include an exhaust gas recirculation EGR line and/or EGR system.

The exhaust line may include one or more emission control devices (not shown), which may be mounted in a close-coupled position in the exhaust line. The one or more emission control devices may include, for example, a three-way catalyst, lean NOx trap, diesel particulate filter, oxidation catalyst, etc.

Figure 2:
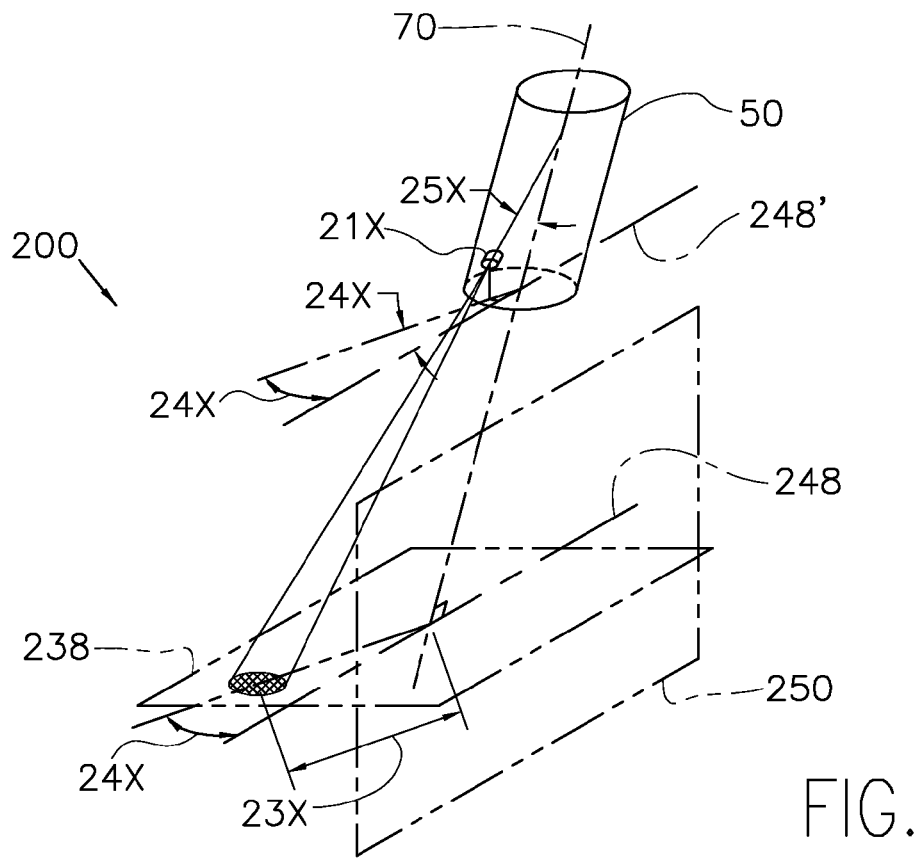
FIG. 2 is a schematic perspective view of a fuel injector showing one nozzle as a generic representation of a plurality of nozzles in accordance with the present disclosure.
Figure 3:
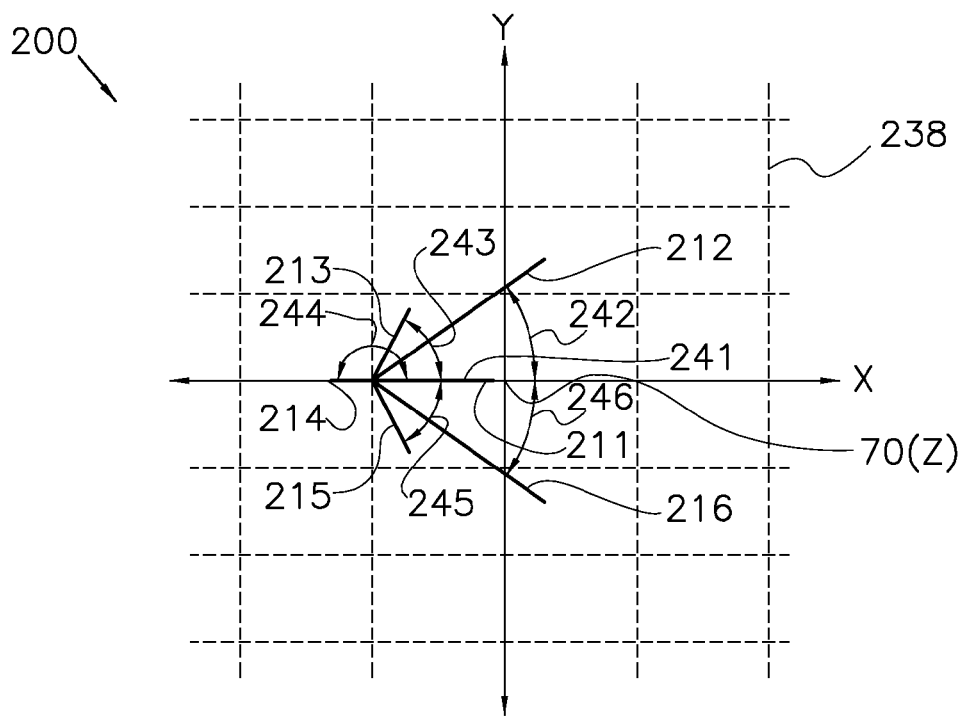
FIG. 3 is a plan view of an example spray pattern illustrating individual spray plumes from the six injector nozzles in accordance with the present disclosure.
Figure 4:
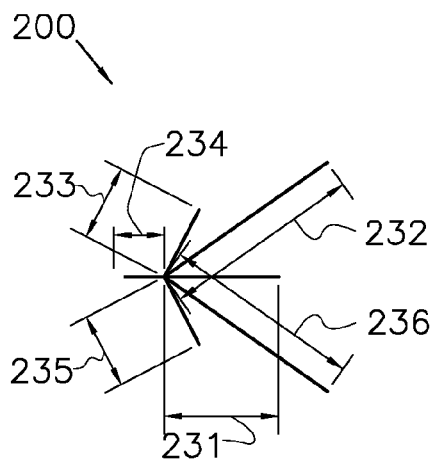
FIGS. 4 and 5 are plan views similar to FIG. 3 illustrating details relative to FIG. 3.
Figure 5:
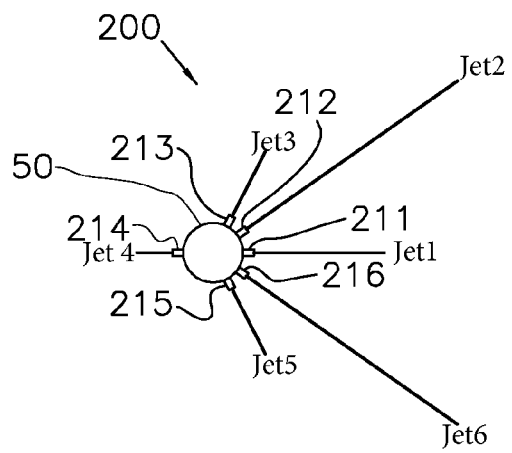
Figure 6:
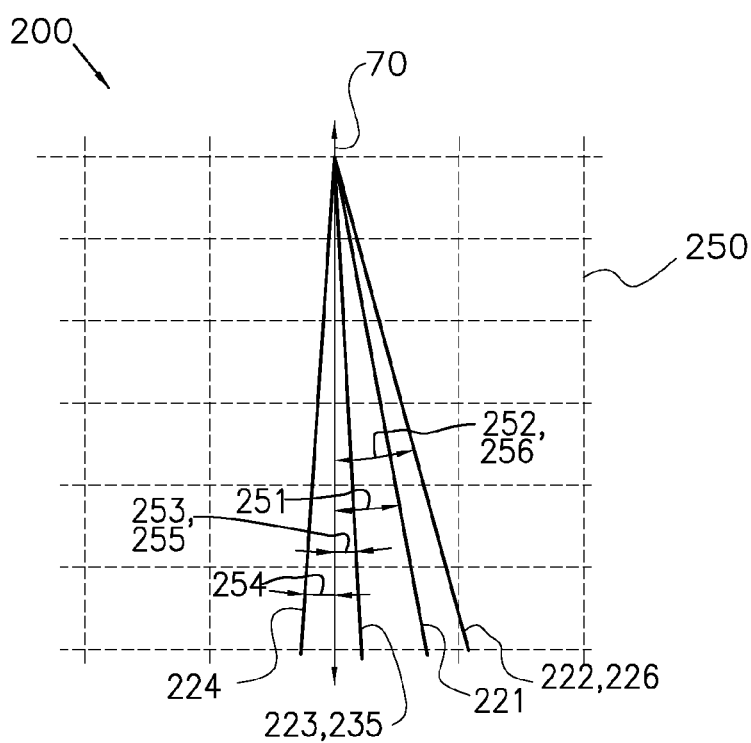
FIG. 6 is a side view of the spray pattern illustrated in FIG. 3.

FIGS. 2-6 are various views illustrating a fuel injector system 200 for an internal combustion engine 10 in accordance with the present disclosure. FIG. 2 is a schematic perspective view of a fuel injector 50 showing one nozzle 21X as a generic representation of a plurality of nozzles, for example six injector nozzles 211, 212, 213, 214, 215, 216 [or jets], disposed around the injector axis 70. Other details are illustrated in FIGS. 3-6. FIG. 3 is a plan view of a spray pattern illustrating individual spray plumes from the six injector nozzles 211, 212, 213, 214, 215, 216 in a plane 238 normal to the injector axis 70 at a predetermine distance downstream from the injector tip, for example at 30 mm. Normal plane angles 241, 242, 243, 244, 245, 246 are indicated to show example orientations of each respective nozzle 211, 212, 213, 214, 215, 216 with respect to a positive X-axis. Positive angles may be considered to be measured counterclockwise. A Y-axis may be along, or parallel with the crank shaft 18 (FIG. 1), and a Z-axis may be along the injector axis 70. Nozzle 211, or jet 1, may point towards the piston bowl 17 wherein jet nozzle 214, or jet 4, may point towards the spark plug 54 location. FIGS. 4 and 5 are plan views similar to FIG. 3 illustrating other details relative thereto. FIG. 6 is a side view of in the center of the cylinder bore with the positive direction toward the intake ports.

Various embodiments may provide a fuel injector system 200 for an internal combustion engine 10. The fuel injector system 200 may include a fuel injector 50 having an injector axis 70. Six injector nozzles 211, 212, 213, 214, 215, 216 [or jets] may be disposed around the injector axis 70. Each of the six injector nozzles 211, 212, 213, 214, 215, 216 may be configured to direct six respective streams 221, 222, 223, 224, 225, 226 of fuel such that each respective stream 221, 222, 223, 224, 225, 226 of fuel may travel respective predetermined six radial distances 231, 232, 233, 234, 235, 236 (FIG. 4) from the injector axis 70 as measured on a plane 238 normal to the injector axis 70. A fourth radial distance 234 may be a shortest distance relative to the other five radial distances 231, 232, 233, 235, 236. A second and a sixth radial distance 232, 236 may be approximately equal to each other and longer than the other four radial distances 231, 233, 234, 235. A third and a fifth radial distance 233, 235 may be approximately equal to each other and may be intermediate radial distances being shorter than the second and sixth radial distance 232, 236 and longer than the fourth radial distance 234. In addition, a first radial distance 231 may be shorter than the second and sixth radial distance 232, 236 and longer than the fourth radial distance 234.

Some embodiments may provide a fuel injector system wherein the first radial distance 231 may be effected by the first nozzle 211 being oriented at a first normal plane angle 241 of between −5 degrees and +5 degrees as measured from a centerline 248 located to correspond with, and/or be parallel with, a combustion chamber centerline 249 (FIG. 1) with a positive direction toward one or more intake ports 31 and a first side angle 251 of between 10 degrees and 20 degrees as measured in a side plane 250 that may be perpendicular to the normal plane 238 and substantially parallel with, or coplanar with, the centerline 248.

The second radial distance 232 may be effected by the second nozzle 212 being oriented a second normal plane angle 242 of between 33.5 degrees and 53.7 degrees as measured in a way similar to the measurement of the first normal plane angle 241, and a second side angle 252 of between 26.2 degrees and 36.2 degrees as measured in a way similar to the measurement of the first side angle 251. The third radial distance 233 may be effected by the third nozzle 213 being oriented a third normal plane angle 243 of between 66.8 degrees and 76.8 degrees as measured in a way similar to the measurement of the first normal plane angle 241, and a third side angle 253 of between 10.1 degrees and 20.1 degrees as measured in a way similar to the measurement of the first side angle 251. The fourth radial distance 234 may be effected by the fourth nozzle 214 being oriented a fourth normal plane angle 244 of between 175 degrees and 185 degrees as measured in a way similar to the measurement of the first normal plane angle 241, and a fourth side angle 254 of between 0 degrees and 10 degrees as measured in a way similar to the measurement of the first side angle 251. The fifth radial distance 235 may be effected by the fifth nozzle 215 being oriented a fifth normal plane angle 245 of between −66.8 degrees and −76.8 degrees as measured in a way similar to the measurement of the first normal plane angle 241, and a fifth side angle 255 of between 10.1 degrees and 20.1 as measured in a way similar to the measurement of the first side angle 251. The sixth radial distance 236 may be effected by the sixth nozzle 216 being oriented a sixth normal plane angle 246 of between −33.5 degrees and −53.7 degrees as measured in a way similar to the measurement of the first normal plane angle 241, and a sixth side angle 256 of between 26.2 degrees and 36.2 degrees as measured in a way similar to the measurement of the first side angle 251.

In some example embodiments the first normal plane angle 241 may be approximately 0 degrees. The third normal plane angle 243 may be approximately 71.8 degrees. The fourth normal plane angle 244 may be approximately 180 degrees. The fifth normal plane angle 245 may be approximately −71.8 degrees.

In some example embodiments—the second normal plane angle 242 may be approximately 38.5 degrees, and the sixth normal plane angle 246 may be approximately −38.5 degrees. However, in some other example embodiments the second normal plane angle 242 may be approximately 48.7 degrees, and the sixth normal plane angle 246 may be approximately −48.7 degrees.

Table A illustrates example ranges of normal plane angle and side plane angles. Table B illustrates some particular example normal plane angle and side plane angles. Table C illustrates other particular example normal plane angle and side plane angles. Other ranges or particular angles may be used.

TABLE A

| Nozzle | normal plane angle (24X) | side plane angles (25X) |
|---|---|---|
| 211 | −5 to 5 | 10 to 20 |
| 212 | 33.5 to 53.7 | 26.2 to 36.2 |
| 213 | 66.8 to 76.8 | 10.1 to 20.1 |
| 214 | 175 to 185 | 0 to 10 |
| 215 | −66.8 to −76.8 | 10.1 to 20.1 |
| 216 | −33.5 to −53.7 | 26.2 to 36.2 |

TABLE B

| Nozzle | normal plane angle (24X) | side plane angles (25X) |
|---|---|---|
| 211 | 0.0 | 15.0 |
| 212 | 38.5 | 31.2 |
| 213 | 71.8 | 15.1 |
| 214 | 180 | 5.0 |
| 215 | −71.8 | 15.1 |
| 216 | −38.5 | 31.2 |

TABLE C

| Nozzle | normal plane angle (24X) | side plane angles (25X) |
|---|---|---|
| 211 | 0.0 | 15.0 |
| 212 | 48.7 | 31.2 |
| 213 | 71.8 | 15.1 |
| 214 | 180 | 5.0 |
| 215 | −71.8 | 15.1 |
| 216 | −48.7 | 31.2 |

Some embodiments may provide a fuel injector 50 for a combustion chamber 14. The fuel injector 50 may include an injector axis 70. The fuel injector 50 may also include six nozzles 211, 212, 213, 214, 215, 216 for spraying a fuel from the injector 50. Each nozzles 211, 212, 213, 214, 215, 216 may be oriented at respective predetermined normal plane angles 241, 242, 243, 244, 245, 246 from a centerline 248 located to correspond with a combustion chamber centerline 249 with a positive direction toward one or more intake ports 31 and as measured within a normal plane 238 which may be oriented normal to the injector axis 70. The six nozzles 211, 212, 213, 214, 215, 216 may include: a first nozzle 211 oriented at a first normal plane angle 241 of between −5 degrees and +5 degrees; a second nozzle 212 oriented at a second normal plane angle 242 of between 33.5 degrees and 53.7 degrees; a third nozzle 213 oriented at a third normal plane angle 243 of between 66.8 degrees and 76.8 degrees; a fourth nozzle 214 oriented at a fourth normal plane angle 244 of between 175 degrees and 185 degrees; a fifth nozzle 215 oriented at a fifth normal plane angle 245 of between −66.8 degrees and −76.8 degrees; and a sixth nozzle 216 oriented at a sixth normal plane angle 246 of between −33.5 degrees and −53.7 degrees.

Some embodiments may provide a fuel injector 50 wherein each of the six nozzles 211, 212, 213, 214, 215, 216 may also oriented at respective predetermined side angles 251, 252, 253, 254, 255, 256 as measured in a side plane 250 that may be perpendicular to the normal plane 238, and may be substantially parallel with the centerline 248. The six side angles 251, 252, 253, 254, 255, 256 may be oriented as follows: the first nozzle 211 may be oriented at a first side angle 251 of between 10 degrees and 20 degrees; the second nozzle 212 may be oriented at a second side angle 252 of between 26.2 degrees and 36.2 degrees; the third nozzle 213 may be oriented at a third side angle 253 of between 10.1 degrees and 20.1 degrees; the fourth nozzle 214 may be oriented at a fourth side angle 254 of between 0 degrees and 10 degrees; the fifth nozzle 215 may be oriented at a fifth side angle 255 of between 10.1 degrees and 20.1 degrees; and the sixth nozzle 216 may be oriented at a sixth side angle 256 of between 26.2 degrees and 36.2 degrees.

Some embodiments may provide a fuel injector 50 for a combustion chamber 14 wherein: the first nozzle 211 may be oriented at a first normal plane angle of approximately 0 degrees; the third nozzle 213 may be oriented at a third normal plane angle 243 of approximately 71.8 degrees; the fourth nozzle 214 may be oriented at a fourth normal plane angle 244 of approximately 180 degrees; and the fifth nozzle 215 may be oriented at a fifth normal plane angle 245 of approximately −71.8 degrees.

With some examples the second nozzle 212 may be oriented at a second normal plane angle 242 of approximately 38.5 degrees; and the sixth nozzle 216 oriented at a sixth normal plane angle 246 of approximately −38.5 degrees. With other examples the second nozzle 212 may be oriented at a second normal plane angle 242 of approximately 48.7 degrees; and the sixth nozzle 216 may be oriented at a sixth normal plane angle 246 of approximately −48.7 degrees.

With some example embodiments the fuel injector 50 may be installed into combustion chamber 14 at an approximately 25° installation angle 72 measured from a horizontal plane 76 of an engine deck face (FIG. 1). The nozzle 211 may then point substantially toward a piston bowl 17 of a piston 16 operatively installed within the combustion chamber 14. The fourth nozzle 214 may point substantially toward the spark plug 54 operatively installed at a top 55 of the combustion chamber 14.

In some examples, the second nozzle 212 may be oriented at a second normal plane angle 242 of between 33.5 degrees and 43.5 degrees, and the sixth nozzle 216 may be oriented at a sixth normal plane angle 246 of between −33.5 degrees and −43.5 degrees. In other examples, the second nozzle 212 may be oriented at a second normal plane angle 242 of between 43.7 degrees and 53.7 degrees, and the sixth nozzle 216 may be oriented at a sixth normal plane angle 246 of between −43.7 degrees and −53.7 degrees.

Some embodiments may provide a fuel injector a system 200. The system 200 may include, a cylinder 12 having a cylinder wall 13 and a cylinder axis 249. The system 200 may also include a spark plug 54, and a piston 16 positioned internally to the cylinder 12. The piston 16 may have a piston bowl 17 at a top end thereof. A fuel injector 50 may have an injector axis 70 and may be positioned in the cylinder wall 13. The fuel injector 50 may include: six nozzles 211, 212, 213, 214, 215, 216 each oriented at respective predetermined normal plane angles 241, 242, 243, 244, 245, 246 from the cylinder axis 249 with a positive direction toward one or more intake ports 31 and as measured within a plane normal 238 to the injector axis 70. The six nozzles 211, 212, 213, 214, 215, 216 may include: a first nozzle 211 oriented at a first normal plane angle 241 of between −5 degrees and +5 degrees; a second nozzle 212 oriented at a second normal plane angle 242 of between 33.5 degrees and 53.7 degrees; a third nozzle 213 oriented at a third normal plane angle 243 of between 66.8 degrees and 76.8 degrees; a fourth nozzle 214 oriented at a fourth normal plane angle 244 of between 175 degrees and 185 degrees; a fifth nozzle 215 oriented at a fifth normal plane angle 245 of between −66.8 degrees and −76.8 degrees; and a sixth nozzle 216 oriented at a sixth normal plane angle 246 of between −33.5 degrees and −53.7 degrees.

With some example of the system 200 each of the six nozzles 211, 212, 213, 214, 215, 216 may also oriented at respective predetermined side angles 251, 252, 253, 254, 255, 256 as measured relative to the injector axis 70. The first nozzle 211 may be oriented at a first side angle 251 of between 10 degrees and 20 degrees. The second nozzle 212 may be oriented at a second side angle 252 of between 26.2 degrees and 36.2 degrees. The third nozzle 213 may be oriented at a third side angle 253 of between 10.1 degrees and 20.1 degrees. The fourth nozzle 214 may be oriented at a fourth side angle 254 of between 0 degrees and 10 degrees. The fifth nozzle 215 may be oriented at a fifth side angle 255 of between 10.1 degrees and 20.1 degrees. The sixth nozzle 216 may be oriented at a sixth side angle 256 of between 26.2 degrees and 36.2.

With some examples of the system 200 the first side angle 251 may be approximately 15 degrees; the second side angle 252 may be approximately 31.2 degrees; the third side angle 253 may be approximately 15.1 degrees; the fourth side angle 254 may be approximately 5 degrees; the fifth side angle 255 may be approximately 15.1 degrees; and the sixth side angle 256 may be approximately 31.2 degrees. The injector axis 70 may be oriented at approximately 25° from a horizontal plane 76 of an engine deck face.

With some examples of the system 200 the first nozzle 211 may be oriented at a first normal plane angle 241 of approximately 0 degrees; the second nozzle 212 may be oriented at a second normal plane angle 242 of approximately 38.5 degrees; the third nozzle 213 may be oriented at a third normal plane angle 243 of approximately 71.8 degrees; the fourth nozzle 214 may be oriented at a fourth normal plane angle 244 of approximately 180 degrees; the fifth nozzle 215 may be oriented at a fifth normal plane angle 245 of approximately −71.8 degrees; and the sixth nozzle 216 may be oriented at a sixth normal plane angle 246 of approximately −38.5 degrees.

With some examples of the system 200 the first nozzle 211 may be oriented at a first normal plane angle 241 of approximately 0 degrees. The second nozzle 212 may be oriented at a second normal plane angle 242 of approximately 48.7 degrees. The third nozzle 213 may be oriented at a third normal plane angle 243 of approximately 71.8 degrees. The fourth nozzle 214 may be oriented at a fourth normal plane angle 244 of approximately 180 degrees. The fifth nozzle 215 may be oriented at a fifth normal plane angle 245 of approximately −71.8 degrees. The sixth nozzle 216 may be oriented at a sixth normal plane angle 246 of approximately −48.7 degrees.

It should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A fuel injector system for an internal combustion engine comprising;

a fuel injector having an injector axis and six injector nozzles disposed around the injector axis, each of the six injector nozzles configured to direct six respective streams of fuel each originating from the injector axis such that each respective stream of fuel travels respective predetermined six radial distances from the injector axis as measured on a plane normal to the injector axis, and wherein:

a fourth radial distance of the six radial distances is a shortest distance relative to the other five radial distances;

a second and a sixth radial distance of the six radial distances are equal to each other and are longer than the other four radial distances;

a third and a fifth radial distance of the six radial distances are equal to each other and are intermediate radial distances being shorter than the second and sixth radial distance and longer than the fourth radial distance;

a first radial distance of the six radial distances is shorter than the second and sixth radial distance and longer than the fourth radial distance; and an injector nozzle of the six injector nozzles directs a stream of fuel having the fourth radial distance in a first direction relative to the injector axis, and all other injector nozzles of the six injector nozzles direct respective streams of fuel in a second direction, opposite the first direction.

2. The fuel injector system of claim 1, wherein:

the first radial distance is effected by the first nozzle being oriented a first normal plane angle of between −5 degrees and +5 degrees as measured from a centerline located to correspond with a combustion chamber centerline with a positive direction toward one or more intake ports, and a first side angle of between 10 degrees and 20 degrees as measured in a side plane perpendicular to the normal plane and parallel with the centerline;

the second radial distance is effected by the second nozzle being oriented a second normal plane angle of between 33.5 degrees and 53.7 degrees as measured from a centerline located to correspond with a combustion chamber centerline with a positive direction toward one or more intake ports, and a second side angle of between 26.2 degrees and 36.2 degrees as measured in a side plane perpendicular to the normal plane and parallel with the centerline;

the third radial distance is effected by the third nozzle being oriented a third normal plane angle of between 66.8 degrees and 76.8 degrees as measured from a centerline located to correspond with a combustion chamber centerline with a positive direction toward one or more intake ports, and a third side angle of between 10.1 degrees and 20.1 degrees as measured in a side plane perpendicular to the normal plane and parallel with the centerline;

the fourth radial distance is effected by the fourth nozzle being oriented a fourth normal plane angle of between 175 degrees and 185 degrees as measured from a centerline located to correspond with a combustion chamber centerline with a positive direction toward one or more intake ports, and a fourth side angle of between 0 degrees and 10 degrees as measured in a side plane perpendicular to the normal plane and parallel with the centerline;

the fifth radial distance is effected by the fifth nozzle being oriented a fifth normal plane angle of between −66.8 degrees and −76.8 degrees as measured from a centerline located to correspond with a combustion chamber centerline with a positive direction toward one or more intake ports, and a fifth side angle of between 10.1 degrees and 20.1 as measured in a side plane perpendicular to the normal plane and parallel with the centerline; and the sixth radial distance is effected by the sixth nozzle being oriented a sixth normal plane angle of between −33.5 degrees and −53.7 degrees as measured from a centerline located to correspond with a combustion chamber centerline with a positive direction toward one or more intake ports, and a sixth side angle of between 26.2 degrees and 36.2 degrees as measured in a side plane perpendicular to the normal plane and parallel with the centerline.

3. The fuel injector system of claim 2, wherein:
the first normal plane angle is 0 degrees;
the third normal plane angle is 71.8 degrees;
the fourth normal plane angle is 180 degrees; and
the fifth normal plane angle is −71.8 degrees.

4. The fuel injector system of claim 3, wherein:
the second normal plane angle is 38.5 degrees; and
the sixth normal plane angle is −38.5 degrees.

5. The fuel injector system of claim 3, wherein:
the second normal plane angle is 48.7 degrees; and
the sixth normal plane angle is −48.7 degrees.

6. A fuel injector for a combustion chamber comprising:
an injector axis; and
six nozzles for spraying a fuel from the injector each oriented at respective predetermined normal plane angles from a centerline located to correspond with a combustion chamber centerline with a positive direction toward one or more intake ports and as measured within a plane normal to the injector axis, the six nozzles including:
a first nozzle oriented at a first normal plane angle of between −5 degrees and +5 degrees;
a second nozzle oriented at a second normal plane angle of between 33.5 degrees and 53.7 degrees;
a third nozzle oriented at a third normal plane angle of between 66.8 degrees and 76.8 degrees;
a fourth nozzle oriented at a fourth normal plane angle of between 175 degrees and 185 degrees;
a fifth nozzle oriented at a fifth normal plane angle of between −66.8 degrees and −76.8 degrees; and
a sixth nozzle oriented at a sixth normal plane angle of between −33.5 degrees and −53.7 degrees, the fourth nozzle configured to direct a stream of fuel in a first direction relative to the injector axis, and all other injector nozzles configured to direct respective streams of fuel in a second direction, opposite the first direction.

7. The fuel injector of claim 6, wherein each of the six nozzles is also oriented at respective predetermined side angles as measured in a plane perpendicular to the normal plane and parallel with the centerline, wherein the six side angles are oriented as follows:
the first nozzle is oriented at a first side angle of between 10 degrees and 20 degrees;
the second nozzle is oriented at a second side angle of between 26.2 degrees and 36.2 degrees;
the third nozzle is oriented at a third side angle of between 10.1 degrees and 20.1 degrees;
the fourth nozzle is oriented at a fourth side angle of between 0 degrees and 10 degrees;
the fifth nozzle is oriented at a fifth side angle of between 10.1 degrees and 20.1 degrees; and the sixth nozzle is oriented at a sixth side angle of between 26.2 degrees and 36.2 degrees.

8. The fuel injector of claim 6, wherein:
the first nozzle is oriented at a first normal plane angle of 0 degrees;
the third nozzle oriented at a third normal plane angle of 71.8 degrees;
the fourth nozzle oriented at a fourth normal plane angle of 180 degrees; and
the fifth nozzle oriented at a fifth normal plane angle of −71.8 degrees.

9. The fuel injector of claim 8, wherein:
the second nozzle is oriented at a second normal plane angle of 38.5 degrees; and
the sixth nozzle oriented at a sixth normal plane angle of −38.5 degrees.

10. The fuel injector of claim 8, wherein:
the second nozzle is oriented at a second normal plane angle of 48.7 degrees; and
the sixth nozzle is oriented at a sixth normal plane angle of −48.7 degrees.

11. The fuel injector of claim 6, wherein the fuel injector is installed into a combustion chamber at a 25° installation angle measured from a horizontal plane of an engine deck face.

12. The fuel injector of claim 11, wherein the first nozzle points toward a piston bowl of a piston operatively installed within the combustion chamber and the fourth nozzle points toward a spark plug operatively installed at a top of the combustion chamber.

13. The fuel injector of claim 6, wherein the second nozzle is oriented at a second normal plane angle of between 33.5 degrees and 43.5 degrees, and the sixth nozzle is oriented at a sixth normal plane angle of between −33.5 degrees and −43.5 degrees.

14. The fuel injector of claim 6, wherein the second nozzle is oriented at a second normal plane angle of between 43.7 degrees and 53.7 degrees, and the sixth nozzle is oriented at a sixth normal plane angle of between −43.7 degrees and −53.7 degrees.

15. A system, comprising:
a cylinder having a cylinder wall and a cylinder axis;
a spark plug;
a piston positioned internally to the cylinder and having a piston bowl at a top end;
a fuel injector having an injector axis and positioned in the cylinder wall, the fuel injector including:
six nozzles each oriented at respective predetermined normal plane angles from the cylinder axis with a positive direction toward one or more intake ports and as measured within a plane normal to the injector axis, the six nozzles including:
a first nozzle oriented at a first normal plane angle of between −5 degrees and +5 degrees;
a second nozzle oriented at a second normal plane angle of between 33.5 degrees and 53.7 degrees;
a third nozzle oriented at a third normal plane angle of between 66.8 degrees and 76.8 degrees;
a fourth nozzle oriented at a fourth normal plane angle of between 175 degrees and 185 degrees;
a fifth nozzle oriented at a fifth normal plane angle of between −66.8 degrees and −76.8 degrees; and
a sixth nozzle oriented at a sixth normal plane angle of between −33.5 degrees and −53.7 degrees, the fourth nozzle configured to direct a stream of fuel in a first direction relative to the injector axis, and all other injector nozzles configured to direct respective streams of fuel in a second direction, opposite the first direction.

16. The system of claim 15, wherein each of the six nozzles are also oriented at respective predetermined side angles as measured relative to the injector axis, wherein:
the first nozzle is oriented at a first side angle of between 10 degrees and 20 degrees;
the second nozzle is oriented at a second side angle of between 26.2 degrees and 36.2 degrees;
the third nozzle is oriented at a third side angle of between 10.1 degrees and 20.1 degrees;
the fourth nozzle is oriented at a fourth side angle of between 0 degrees and 10 degrees;
the fifth nozzle is oriented at a fifth side angle of between 10.1 degrees and 20.1 degrees; and
the sixth nozzle is oriented at a sixth side angle of between 26.2 degrees and 36.2.

17. The system of claim 16, wherein:
the first side angle is 15 degrees;
the second side angle is 31.2 degrees;
the third side angle is 15.1 degrees;
the fourth side angle is 5 degrees;
the fifth side angle is 15.1 degrees; and
the sixth side angle is 31.2 degrees.

18. The system of claim 17, wherein the injector axis is oriented at 25° from a horizontal plane of an engine deck face.

19. The system of claim 16, wherein:
the first nozzle is oriented at a first normal plane angle of 0 degrees;
the second nozzle is oriented at a second normal plane angle of 38.5 degrees;
the third nozzle is oriented at a third normal plane angle of 71.8 degrees;
the fourth nozzle is oriented at a fourth normal plane angle of 180 degrees;
the fifth nozzle is oriented at a fifth normal plane angle of −71.8 degrees; and
the sixth nozzle is oriented at a sixth normal plane angle of −38.5 degrees.

* * * * *